United States Patent [19]

Kashihara et al.

[11] Patent Number: 4,844,326
[45] Date of Patent: Jul. 4, 1989

[54] METHOD OF AND SYSTEM FOR ASSEMBLING VEHICLE BODIES

[75] Inventors: Teruo Kashihara; Makoto Shigenaka, both of Hiroshima, Japan

[73] Assignee: Mazda Motor Corporation, Hiroshima, Japan

[21] Appl. No.: 254,097

[22] Filed: Oct. 6, 1988

[30] Foreign Application Priority Data

Oct. 8, 1987 [JP] Japan .................... 62-255472

[51] Int. Cl.$^4$ .............. B23K 11/10; B23K 11/32
[52] U.S. Cl. .................... 228/182; 228/212; 228/213; 228/44.3; 228/49.1; 219/86.24; 219/89; 219/91.2; 219/158
[58] Field of Search ........... 228/182, 212, 213, 44.3, 228/47, 49.1; 219/86.1, 86.24, 89, 91.2, 158

[56] References Cited

U.S. PATENT DOCUMENTS

| 4,611,749 | 9/1986 | Kawano ............... 228/45 |
| 4,667,866 | 5/1987 | Tobita et al. ......... 228/49.1 |
| 4,678,110 | 7/1987 | Handa ................. 228/47 |

FOREIGN PATENT DOCUMENTS

| 36383 | 4/1981 | Japan ............... 219/86.24 |
| 216869 | 9/1986 | Japan ............... 219/86.24 |

Primary Examiner—Nicholas P. Godici
Assistant Examiner—Samuel M. Heinrich
Attorney, Agent, or Firm—Gerald J. Ferguson, Jr.

[57] ABSTRACT

A system for assembling a vehicle body has a panel handling device provided with a panel holding tool for holding a body panel and a first welding gun for welding the body panel to a vehicle body. A robot has a connecting mechanism to which the panel handling device or a second welding gun is selectively connected. A panel setting mechanism which is provided with a support portion for supporting the panel handling device delivered by the robot locates the panel handling device so that the body panel on the panel handling device is correctly positioned for incorporation into the vehicle body. The second welding gun is connected to a power source, and said panel handling means is provided with a power receiving portion by way of which the first welding gun receives power supplied by the second welding gun which is held by the robot.

9 Claims, 3 Drawing Sheets

METHOD OF AND SYSTEM FOR ASSEMBLING VEHICLE BODIES

BACKGROUND OF THE INVENTION

1. Field of the Invention

This invention relates to a method of and a system for assembling a vehicle body.

2. Description of the Prior Art

Robots have been employed to transfer vehicle bodies from one working station to another in a vehicle body assembly line. Such robots are often provided with an arm on which a material handling member for handling a body panel, which is to be incorporated into the vehicle body and a welding gun are removably mounted. That is, the material handling member is mounted on the arm when the robot transfers the body panel to the incorporating position, i.e., the position from which the body panel may be incorporated into the vehicle body, and when it welds the body panel to the vehicle body, the robot changes the material handling member for the welding gun. (See U.S. Pat. No. 4,611,749, for instance.)

In the case where the welding gun mounted on the robot is a general purpose gun, a bulge or the like on the body panel near the area to be welded can interfere with the gun and prevent welding of the body panel from taking place. In such a case, the general purpose welding gun must be changed for a welding gun used exclusively for a particular welding. However, switching the welding guns is troublesome and requires additional accessories such as a transformer, which adds to the manufacturing cost.

SUMMARY OF THE INVENTION

In view of the foregoing observations and description, the primary object of the present invention is to provide a method of and a system for assembling a vehicle body which are free from the drawbacks described above.

The method in accordance with the present invention comprises steps of causing a robot to hold a panel handling means carrying a first welding gun, causing the robot to deliver the panel handling means together with a body panel held by the panel handling means to a panel setting means, causing the panel setting means to locate the panel handling means so that the body panel on the panel handling means is positioned in an incorporating position with respect to a vehicle body, causing the robot to hold a second welding gun and energizing the first welding gun by way of the second welding gun to weld the body panel to the vehicle body.

The system in accordance with the present invention comprises a panel handling means provided with a panel holding tool for holding a body panel and a first welding gun for welding the body panel to a vehicle body, a robot having a connecting means to which the panel handling means or a second welding gun is selectively connected, and a panel setting means which is provided with a support portion for supporting the panel handling means delivered by the robot and locates the panel handling means so that the body panel on the panel handling means is positioned in an incorporating position with respect to the vehicle body, said second welding gun being connected to a power source, and said panel handling means being provided with a power receiving portion by way of which the first welding gun receives power supplied by the second welding gun held by the robot.

The first welding gun is for welding a portion of the panel which is difficult to weld with a general purpose welding gun, i.e., the second welding gun. Because the first welding gun is located on the panel handling means, it is moved simultaneously with the body panel and is correctly positioned with respect to the body panel. The panel setting means receives the panel handling means, which includes the first welding gun, and supports the panel handling means and locates it so that the panel may be incorporated into the vehicle body. Accordingly, after the panel setting means receives the panel handling means, the first welding gun need not be changed for the second welding gun. Further, additional power supply means for the first welding gun is not required.

DESCRIPTION OF THE PREFERRED EMBODIMENT

Figure 1:
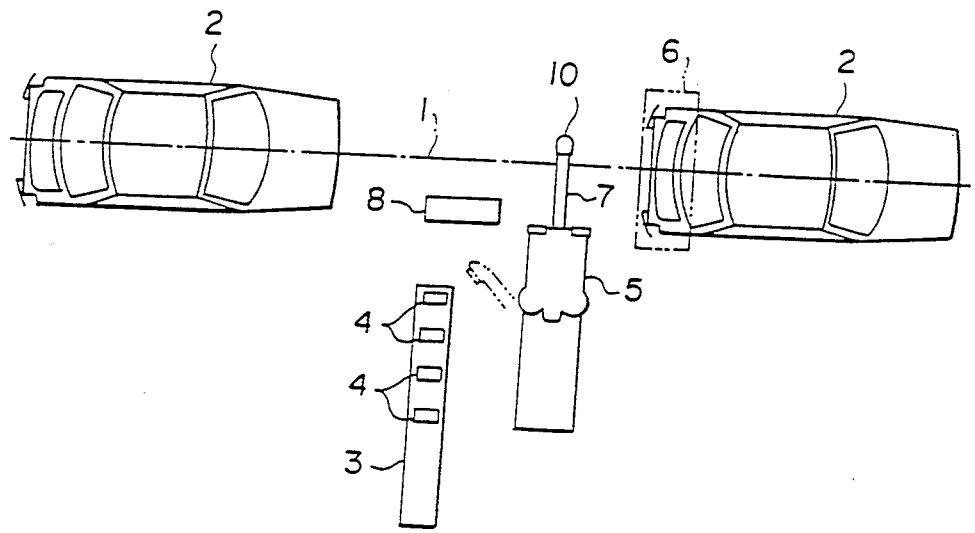
FIG. 1 is a plan view showing a system in accordance with an embodiment of the present invention.

FIG. 1 shows a vehicle body assembly line 1, which is provided with a panel supply system 3 for supplying rear end panels 4 which are to be incorporated into vehicle bodies 2, and a robot 5. The rear end panel 4 is incorporated in the vehicle body 2 at an incorporating station 6. The robot 5 is provided with an arm 7 and a chucking means 10 mounted on the free end of the arm 7 to selectively chuck a welding gun (to be described later) located on a gun table 8 or panel handling means 9 shown in FIG. 2. The robot 5 drives the arm 7 to move the chucking means 10 among a panel receiving position corresponding to the location of the panel supply system 3, an incorporating position corresponding to the location of the station 6 and a gun receiving position corresponding to the location of the gun table 8. The station 6 is provided with a panel setting means 11 shown in FIG. 3.

Figure 2:
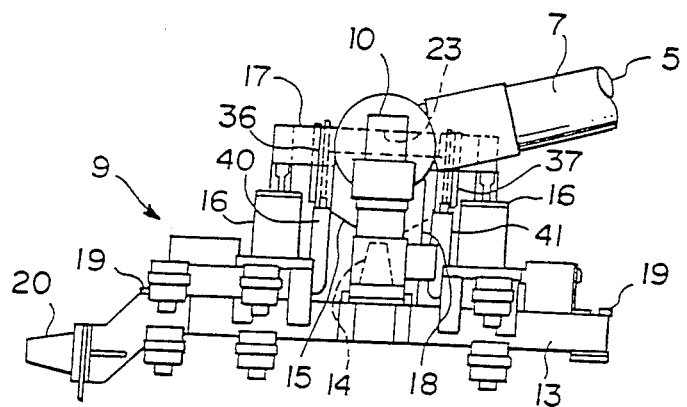
FIG. 2 is a front view showing the relation between the robot and the panel handling means employed in the system of FIG. 1.
Figure 3:
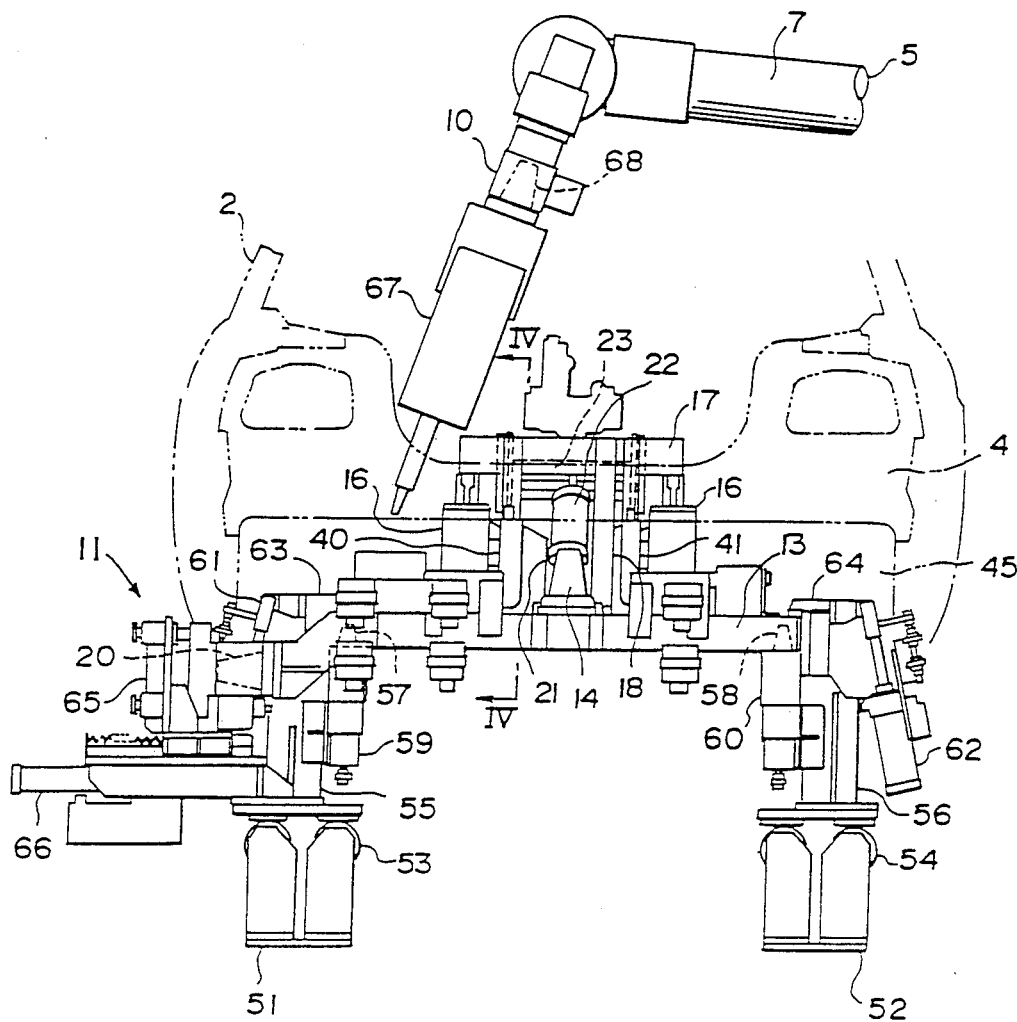
FIG. 3 is a front view showing the incorporation of the body panel into the vehicle body.

As shown in FIGS. 2 and 3, the panel handling means 9 includes a base 13 extending transversely to the vehicle body 2. At the middle portion of the base 13, a connecting portion 14 for connection with the chucking means 10 of the robot 5 and a holding tool 15 for holding the rear end panel 4 are provided. Further, a pair of first welding guns 16 are provided on the base 13 on opposite sides of the connecting portion 14 and the holding tool 15. Power receiving portions 17 for receiving power supply for the first welding guns 16 are supported on support columns 18. On opposite end portions of the base 13 are provided a pair of clamp portions 19 for connection with the panel setting means 11. Further, an air receiving portion 20 for receiving air for the panel handling means 9 from the panel setting means is provided on one end portion of the base 13. The air receiving portion 20 is connected with an air supply means 65 on the panel setting means 11 when the panel handling means 9 is set in the panel setting means 11 to supply air to the holding tool 15 and the first welding guns 16. The connecting portion 14 for connection with the chucking means 10 also functions as an air receiving portion for receiving air for the panel handling means 9 from the robot 5. This air is supplied to the holding tool 15 and the first welding guns 16 together with the air supplied through the air receiving portion 20.

In the panel handling means 9, the holding tool 15 for holding the rear end panel 4 is provided with a cylinder device 22 supported on a support member 21 on the base 13, and a holding claw 23 driven by the cylinder device 22 to catch an upper portion of the rear end panel 4.

Figure 4:
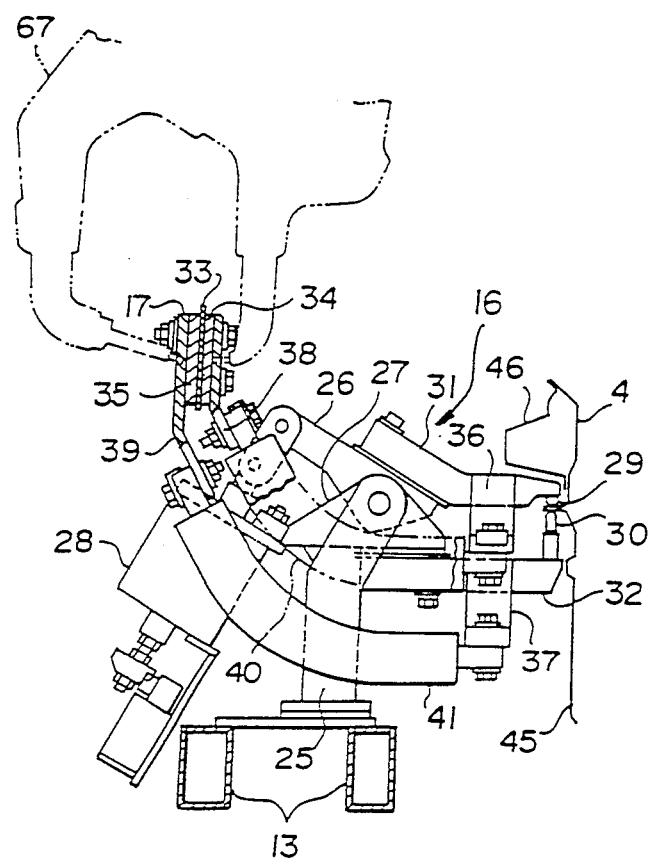
FIG. 4 is a cross-sectional view taken along line IV—IV in FIG. 3.

As shown in FIG. 4, the first welding gun 16 is a modification of a so-called X-shaped type one, and comprises upper and lower arms 26 and 27 pivoted on a support member 25 fixed to the base 13. The arms 26 and 27 are connected by a cylinder device 28 at respective base ends, and electrode holders 31 and 32 are fixed to the free ends of the respective arms so that electrode tips 29 and 30 mounted on the free ends of the respective arms 26 and 27 are opposed to each other.

The power receiving portion 17 has a pair of conductive power receiving plates 34 and 35 superposed with an insulating plate 33 sandwiched therebetween. Conductive plates 36 and 37 fixed to the electrode holders 31 and 32 of the first welding gun 16 are respectively connected to by cables 40 and 41 conductive plates 38 and 39, which are fixed to the power receiving plates 34 and 35. Although only one of the first welding guns 16 is shown in FIG. 4, the other first welding gun 16 is also connected to the power receiving plates 34 and 35 in a similar manner.

In this particular embodiment, the first welding guns 16 are used for welding the lower edge of the rear end panel 4 to the upper edge of a rear skirt 45 separating the passenger room from the trunk. However, there is a portion 46 which bulges and projects rearward from rear end panel 4. The bulging portion 46 prevents the welding electrodes of a general purpose welding gun from being inserted and therefore, the welding guns 16 used exclusively for this job and having the aforesaid structure are employed.

The panel setting means 11 comprises left and right jigs 51 and 52. The jigs 51 and 52 respectively have support members 55 and 56 which extends upward and are fixedly mounted on sliders 53 and 54. The sliders 53 and 54 are movable in the longitudinal direction of the vehicle body. Supports 59 and 60, respectively having upwardly projecting locator pins 57 nd 58, are supported on support members 55 and 56. Clamping claws 63 and 64 which are also supported on the support members 55 and 56, and are driven by cylinder devices 61 and 62, hold the clamp portions 19 of the panel handling means 9 in a predetermined position with respect to the supports 59 and 60. An air supply means 65 to be connected with the air receiving portion 20 of the panel handling means 9 is mounted on the left jig 51 to be moved toward and away from the air receiving portion 20 by a cylinder device 66.

The panel setting means 11 is moved forward while supporting the panel handling means 9 which carries the rear end panel 4 and positions the rear end panel 4 correctly with respect to the rear skirt 45.

In FIG. 3, the robots 5 holds a second welding gun 67. The second welding gun 67 is of the so-called C-shaped type and has a connecting portion 68 for connection with the chucking means 10 of the robot 5. The second welding gun 67 is connected to a power source (transformer) by way of a cable. The second welding gun 67 is placed on the gun table 8 when it is not being used.

When the vehicle body 2 is conveyed to the station 6 in the assembly line 1, the robot 5 picks up the rear end panel 4 from the panel supply system 3 with the panel handling means 9 held by the chucking means 10 on the arm 7. In this case, the rear end panel 4 is held at the upper edge portion thereof by the holding claw 23 driven by the cylinder device 22.

Then the robot 5 causes the panel setting means 11 to support the panel handling means 9 at the station 6, and releases the handling means 9 from the chucking means 10, and brings the second welding gun 67 from the gun table 8. When the panel handling means 9 is supported by the panel setting means 11, the clamp portions 19 on opposite end portions of the base 13 of the panel handling means 9 are engaged with the locater pins 57 and 58 and the panel handling means 9 is held on the supports 59 and 60 by the clamping claws 63 and 64. By engaging the clamp portions 19 with the locater pins 57 and 58, the panel handling means 9 is positioned correctly with respect to the panel setting means 11, and thereby, the rear end panel 4 is correctly positioned with respect to the vehicle body 2. At the same time, the cylinder device 66 operates to connect the air supply means 65 to the air receiving section 20 of the panel handling means 9 and the air driving means (not shown) for the holding tool 15 and the cylinder device 28 for the first welding guns 16 are supplied with air from the panel setting means 11 in stead of from the robot 5. The panel setting means 11 moves the left and right jigs 51 and 52 forward in order to correctly position the rear end panel 4 in place with respect to the rear skirt 45. At this time the first welding guns 16 are positioned so that the areas of the rear end panel 4 and the rear skirt 45 which are to be welded together intervene between the electrode tips 29 and 30 of each first welding gun 16.

The robot 5 then picks up the second welding gun 67 on the gun table 8 using the chucking means 10 and brings it to the station 6, where the robot 5 brings the electrode tips of the second welding gun 67 into abutment against the power receiving plates 34 and 35 of the power receiving portion 17 of the panel handling means 9 as shown in FIG. 4. With the second welding gun 67 in this position, the electrode tips 29 and 30 of each of the first welding guns 16 can be supplied with power from the power source of the second welding gun 67, the electrode tips, the power receiving plates 34 and 35, and the cables 40 and 41. By operating the cylinder device 28 to bring the electrode tips 29 and 30 into abutment against the areas of the rear end panel 4 and the rear skirt 45 which are to be welded and energizing the tips 29 and 30 with power from the second welding gun 67 at this time, the desired areas are welded together.

The second welding gun 67 can perform welding by itself at other areas of the rear end panel 4 and the rear skirt 45 which need welding, and at areas of the rear end panel 4 or the rear skirt which might need to be welded with other panels, anytime it does not supply power to the first welding guns 16.

After incorporation of the rear end panel 4 into the vehicle body 2, the robot 5 returns the second welding gun 67 to the gun table 8 and takes the panel handling means 9 from the panel setting means 11 to prepare for the incorporation of another rear end panel 4 into another vehicle body 2.

Though an embodiment of the present invention has been described in conjunction with the incorporation of rear end panels into rear skirts, the present invention can be applied to the incorporation of other types of panels into other parts of vehicles.

We claim:

1. A method of assembling a vehicle body comprising the steps of causing a robot to hold a panel handling means which carries a first welding gun, causing the robot to deliver the panel handling means together with a body panel held by the panel handling means to a panel setting means, causing the panel setting means to locate the panel handling means so that the body panel on the panel handling means is correctly positioned for incorporation into a vehicle body, causing the robot to hold a second welding gun and energizing the first welding gun through use of the second welding gun in order to weld the body panel to the vehicle body.

2. A method of assembling a vehicle body as defined in claim 1 in which said second welding gun directly performs welding on the vehicle body before and/or after the first welding gun is energized through use of the second welding gun.

3. A method of assembling a vehicle body as defined in claim 1 in which said robot releases the panel handling means after delivering the panel handling means to the panel setting means, moves to a predetermined position where said second welding gun is chucked to the robot, performs welding on the vehicle body with the second welding gun, returns the second welding gun to the predetermined position, secures the panel handling means to itself and takes the panel handling means away from the panel setting means and then moves to pick up another panel with the panel handling means.

4. A method of assembling a vehicle body as defined in claim 1 in which said panel handling means holds the body panel with a panel holding tool, and said first welding gun and the panel holding tool are operated by fluid supplied from a fluid source on the robot when the panel handling means is on the robot and are operated by fluid supplied from another fluid source on the panel setting means when the panel handling means is on the panel setting means.

5. A system for assembling a vehicle body comprising a panel handling means provided with a panel holding tool for holding a body panel and a first welding gun for welding the body panel to a vehicle body, a robot having a connecting means to which the panel handling means or a second welding gun is selectively connected, and a panel setting means which is provided with a support portion for supporting the panel handling means delivered by the robot and locates the panel handling means so that the body panel on the panel handling means is positioned in an incorporating position with respect to the vehicle body, said second welding gun being connected to a power source, and said panel handling means being provided with a power receiving portion through which the first welding gun receives power supplied by the second welding gun held by the robot.

6. A system for assembling a vehicle body as defined in claim 5 in which said panel handling means and the second welding gun have connecting portions which are the same in shape and adapted to be engaged with the connecting means of the robot.

7. A system for assembling a vehicle body as defined in claim 5 in which said panel handling means includes a panel holding tool and a driving means for driving the panel holding tool, and said panel setting means is provided with a fluid source for operating the driving means.

8. A system for assembling a vehicle body as defined in claim 5 in which said panel setting means is provided with a fluid source for operating a driving means for driving said first welding gun.

9. A system for assembling a vehicle body as defined in claim 8 in which said panel handling means includes a panel holding tool and a driving means for operating both the driving means for driving the panel handling tool and the first welding gun.

* * * * *